United States Patent [19]
Howell

[11] 3,844,258
[45] Oct. 29, 1974

[54] INTERNAL COMBUSTION ENGINE

[76] Inventor: Roy M. Howell, 115 Meadbrook Rd., Garden City, N.Y. 11530

[22] Filed: Jan. 29, 1973

[21] Appl. No.: 327,752

[52] U.S. Cl............................ 123/43 AA, 123/78 R
[51] Int. Cl....................... F02b 57/00, F02b 75/04
[58] Field of Search. 123/78 R, 78 A, 43 A, 43 AA, 123/43 R

[56] References Cited
UNITED STATES PATENTS

| | | | |
|---|---|---|---|
| 928,715 | 7/1909 | Thurber | 123/43 A |
| 1,283,331 | 10/1918 | Seitz | 123/78 A |
| 1,557,710 | 10/1925 | Lennon | 123/78 A |
| 1,569,525 | 1/1926 | Owens | 123/43 A |
| 3,673,991 | 7/1972 | Winn | 123/78 R |

Primary Examiner—Wendell E. Burns
Attorney, Agent, or Firm—Andrew J. French

[57] ABSTRACT

An internal combustion engine equipped with means responsive to the operating cycle of the engine to reduce the effective combustion chamber volume during the exhaust portion of the cycle to a volume less than that at the end of the compression portion of the cycle, for more complete removal of exhaust gases.

3 Claims, 5 Drawing Figures

3,844,258

INTERNAL COMBUSTION ENGINE

BACKGROUND AND SUMMARY OF THE INVENTION

This invention relates in general to piston type internal combustion engines and more particularly to an improved internal combustion engine in which more of the exhaust gases produced in each cycle are expelled during the exhaust portion of the cycle than in the case of conventional, fixed stroke engines.

In the conventional interal combustion engine, so much of the burned air-fuel mixture, or exhaust gases, remains in the cylinder at the beginning of the next cycle intake stroke, that the incoming air-fuel mixture is diluted by as much as 15 to 50 percent. This dilution inhibits the combustion process and thereby results in the emission of noxions chemical pollutants in the discharged exhaust of the engine.

In the typical prior art engine, the maximum cylinder volume swept by the piston during the exhaust stroke is limited by the stroke length set for the compression stroke. For complete expulsion of exhaust gases, it would be required to have a stroke length that would sweep the full cylinder volume, whereas for non-diesal compression ratios such ideal exhaust stroke length would be unsuitable as the compression stroke length.

As a solution to the exhaust-compression conflict, the invention provides an improved engine equipped with means responsive to the engine operating cycle and operable to reduce the effective combustion chamber volume during the exhaust portion of the cycle to a volume less than that at the end of the compression part of the cycle to aid in the expulsion of exhaust gases from each working cylinder of the engine.

Certain prior art engines, such as those exemplified by U.S. Pat. No. 2,163,015 issued to F. C. Wagner, U.S. Pat. No. 1,972,335 issued to A. B. Gardner, and U.S. Pat. No. 2,227,736 issued to H. G. Olson have provided means for varying the effective combustion chamber volume as a function of power level, as by changing the stroke lengths of the pistons to controllably vary the intensity of the power impulse in harmony with the fuel consumed by the engine in direct proportion to the engine horsepower output. The basic difference between the subject invention and prior art adjustable stroke engines is that the stroke length of such prior art engines was set at a fixed value for the entire cycle, depending upon power level, whereas the invention provides for variation of stroke length, or more precisely, effective combustion chamber volume, within the cycle, regardless of power level.

According to one preferred embodiment of the invention, variation of effective combustion chamber volume is achieved through the agency of an auxiliary chamber communicating with a corresponding working cylinder, and an auxiliary piston disposed for travel in the auxiliary chamber. Linkage means driven, as by the timing cam, in accordance with the operation cycle of the engine, and connected to the auxiliary piston moves the auxiliary piston to a retracted position to receive in the auxiliary chamber the air-fuel mixture to be ignited at the end of the compression part of the cycle. Thus, the volume available in the auxiliary chamber, with the auxiliary piston retracted, allows the stroke of the working cylinder piston to be of a length that corresponds to substantially a complete sweep of the working cylinder. The diameter of the auxiliary chamber or cylinder can be made much smaller than that of the working cylinder since the auxiliary cylinder need only contain that portion of the air-fuel charge at maximum compressed volume that exceeds the clearance volume of the working cylinder. During the exhaust portion of the cycle, the auxiliary piston is driven by the linkage means to sweep burnt gases from the auxiliary cylinder and the working piston is likewise driven by the crankshaft to sweep burnt gases from the working cylinder. At the end of the exhaust portion of the cycle, the only unexpelled gases are contained in a volume which is the sum of the working cylinder and auxiliary cylinder clearance volumes. The sum of these two clearance volumes, is in accordance with the invention, much less than the sum of the working cylinder and auxiliary cylinder volumes at the end of compression. By making the effective combustion chamber volume at the end of exhaust less than that at the end of compression, it is thus possible to effect a more complete expulsion of combustion products than if there was the same effective volume at both the end of exhaust and the end of compression.

According to a further preferred embodiment of the invention there is provided a cam shaped in accordance with the timing of the operating cycle of the engine, and means coupling each power developing piston of the engine for movement relative to the cam to thereby adjust the stroke of such piston in accordance with the timing of the cycle. Thus, each piston has a stroke length for compression that is determined by the volumetric compression ratio, as in the case of a conventional engine. However, the cam operates to increase the piston stroke length during the exhaust part of the cycle to give a more complete expulsion of burnt gases. Consequently, the compression ration choice does not impose any limitations upon the expulsion of burnt gases during exhaust.

For a better understanding of the invention and its various advantages, reference should be had to the following detailed description and accompanying drawings which together exemplify certain preferred embodiments of the invention.

DESCRIPTION OF THE PREFERRED EMBODIMENTS OF THE INVENTION

Figure 1:
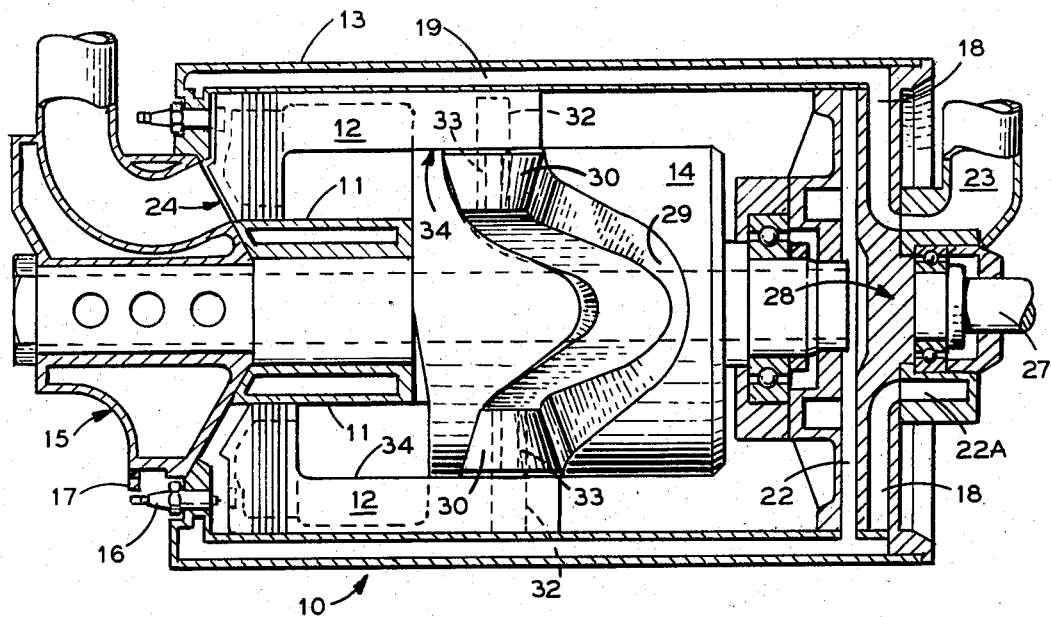
FIG. 1 is a schematic longitudinal cross-sectional view of an internal combustion engine constructed in accordance with a preferred embodiment of the invention.
Figure 2:
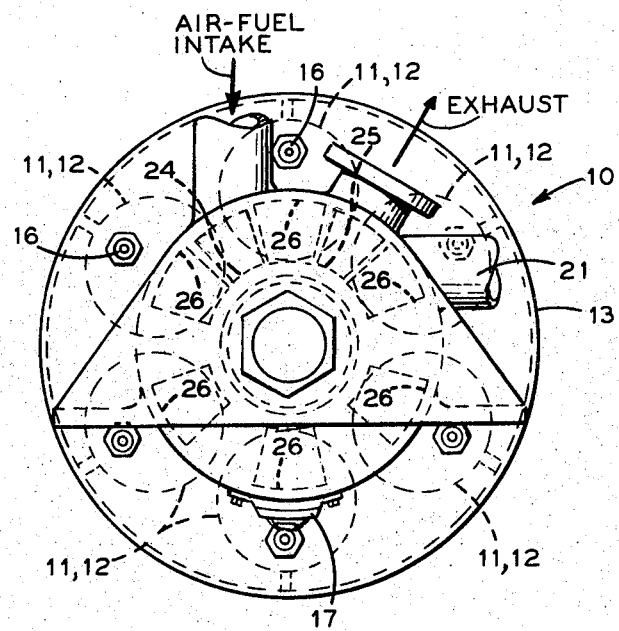
FIG. 2 is an end view, partly broken away, of the engine shown in FIG. 1.

In FIGS. 1 and 2 there is shown a barrel-like engine 10 having a plurality of working cylinders 11 with respective individual pistons 12 axially disposed in a block 13 that is arranged to rotate about a central cylindrical cam 14 and cylinder head 15 that are fixed.

Extending into cylinders 11 are respective spark plugs 16 mounted through suitable threaded holes in the end of block 13, which plugs 16 rotate with block 13 and pass in sequence against a stationary electrical contact 17 which applies firing voltage to each plug 16 when its associated cylinder 11 arrives at an angular position about the axis of cam 14 corresponding to the intended firing time in the compression part of the engine operating cycle.

As in the case of conventional engines, the block 13 is provided with cooling passages 18, 19 which are supplied with coolant through an inlet 21 and rotary coupling 22 and which discharge coolant through a similar rotary coupling 22A and outlet 23 located at the opposite end of engine 10.

Lubrication of the various working parts of engine 10 is expediently by passages (not shown) extending within the body of cam 14 and communicating with those parts intended to be lubricated.

In cylinder head are provided an intake port 24 and an exhaust port 25. Each cylinder 11 has a port 26 which registers with the intake port 24 and exhaust port 25 once during each four-stroke cycle at the intake and exhaust portions thereof respectively. For purposes of example, a single intake port 24 and a single exhaust part 25 are shown, since the engine 10 is designed and timed for one complete four-stroke cycle per revolution of the cylinder block 13. If it should be desired to increase the number of cycles per revolution about the cam 14, the number of intake and exhaust ports would be multiplied accordingly, and the cam 14 contour would be correspondingly modified.

Useful rotary power output of engine 10 is derived by the pistons 12 reacting against cam 14 to push the cylinder block 13 assembly around the longitudinal axis of cam 14. Rotary movement of block 13 is delivered by an output shaft 27 connected to the end of block 13 by a flange 28.

Figure 3:
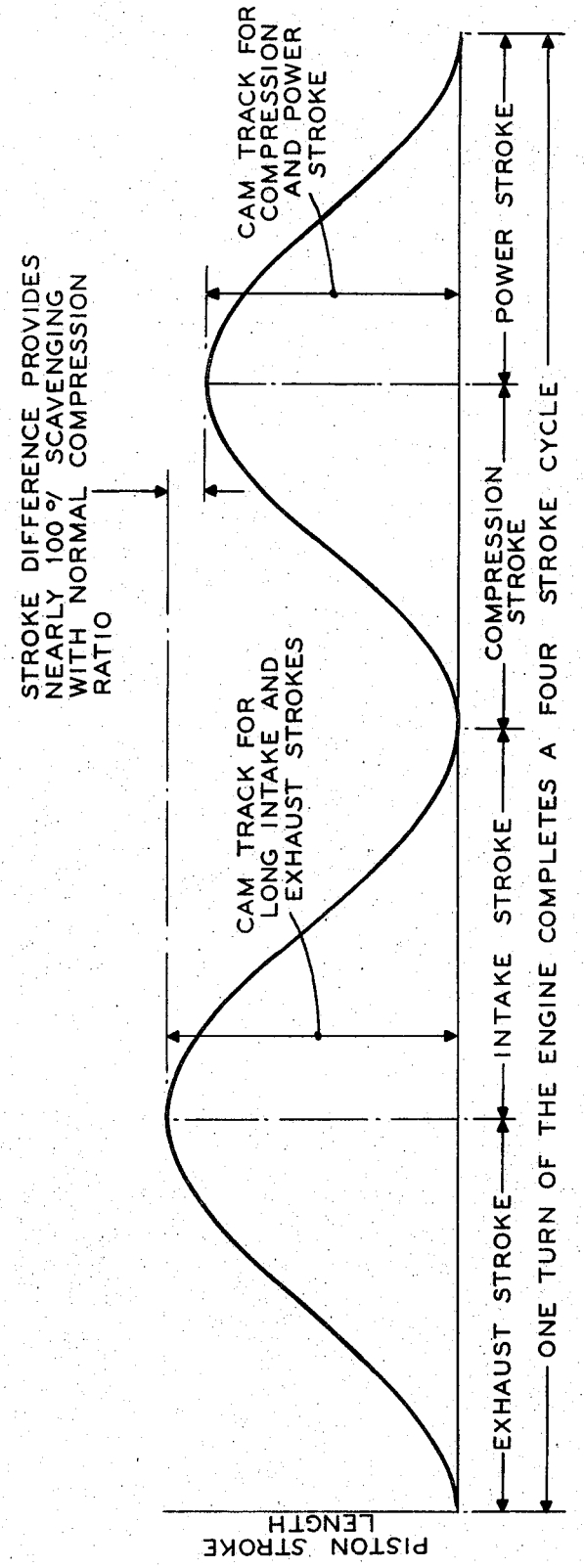
FIG. 3 is a graphical layout of the profile of the cylindrical cam used in the engine shown in FIG. 1.

From FIGS. 1 and 3 it can be noted that cam 14 has a circumferentially endless track 29, which in the axial direction of cam 14 varies somewhat as a sinusoidal function of the angular distance about the circumference. The pistons 12 are each equipped with a follower 30 that is received in track 29 so that the axial thrust developed by the burning of air-fuel mixture in the cylinders 11 is converted by the inclined surface action of cam track 29 into a torque that turns the piston-and-cylinder block 13 assembly about the cam 14 axis.

For purposes of example, the development of cam track 29 has been laid out in FIG. 3 from left to right beginning with the full piston displacement at the start of the exhaust stroke. At the end of the exhaust stroke, the piston has swept nearly the full length of the cylinder, and then returns out to the full displacement during the intake stroke. However, in the compression stroke, the contour of cam track 29 limits the inward travel of the piston toward the head to a distance established by the chosen compression ratio.

Thus, the cam track 29 is shaped in accordance with the timing of the operating cycle of the engine 10, and for each power developing piston 12 the follower means 30 that couples the piston for movement relative to cam track 29 adjusts the effective stroke of such piston 12 in accordance with the cycle timing. This cooperation of the pistons 12, their followers 30 and cam track 29 results in reducing the effective combustion chamber volume in each cylinder 11 during the exhaust part of the cycle to a volume less than that at the end of the compression part of the cycle to aid in the expulsion of exhaust gases from each cylinder 11 of engine 10. Because in the engine 10, the compression ratio does not limit the minimum clearance during exhaust, it is possible to effect expulsion of some 95 percent of the burned clearance gases in each cycle.

The follower 30 is expediently a frustro-conical roller mounted on a shaft 32 for rotation relative thereto with the aid of suitable bearing means 33.

The particular design of engine 10 illustrated in FIGS. 1 and 2 offers many practical advantages including compactness. In this embodiment of the invention, the cylinders 11 and pistons 12 rotate about the fixed cam track 29 and cylinder head 15 to provide the valving functions required by the typical four stroke cycle internal combustion engine. Because the cylinders 11 have ports 26 that register in sequence with the intake port 24 and exhaust port 25 provided in the cylinder head 15, no separate valves or valve operating means are required as in the conventional engine.

A significant savings in size, weight and cost per horsepower output is afforded by the engine 10 over conventional engines which require a crankshaft and connecting rods.

It should be noted that compactness is achieved in engine 10 because for the given radial distance at which cylinders 11 and pistons 12 are located from the axis of cam 14, such cam 14 itself extends radially beyond that distance and the pistons 12 have cut-away skirts 34 that accommodate movement of the pistons axially in overlapping relation to the cam 14, and the followers 30 connected to corresponding pistons 12 extend radially inward toward cam 14. The piston skirts 34 have a concave matching the peripheral surface of cam 14 so that the skirts 34 bear against cam 14 in sliding contact therewith. This stabilizes the pistons 12 against rotary movement relative to their cylinders 11 and maintains correct orientation of the pistons 12.

While the engine 10 has a stationary cylindrical cam 14 and cylinders 11 in a block 13 that rotates relative to cam 14 and cylinder head 15, the inventive concept of varying the piston stroke length within the cycle is also applicable to engine designs wherein the cam would rotate relative to a fixed cylinder block assembly.

It should be understood that while the engine 10 has a cam 14 that is contoured to vary piston length within the cycle, the invention is also applicable to an engine in which the cam contour is made to give an equal piston stroke length throughout the cycle.

Figure 4:
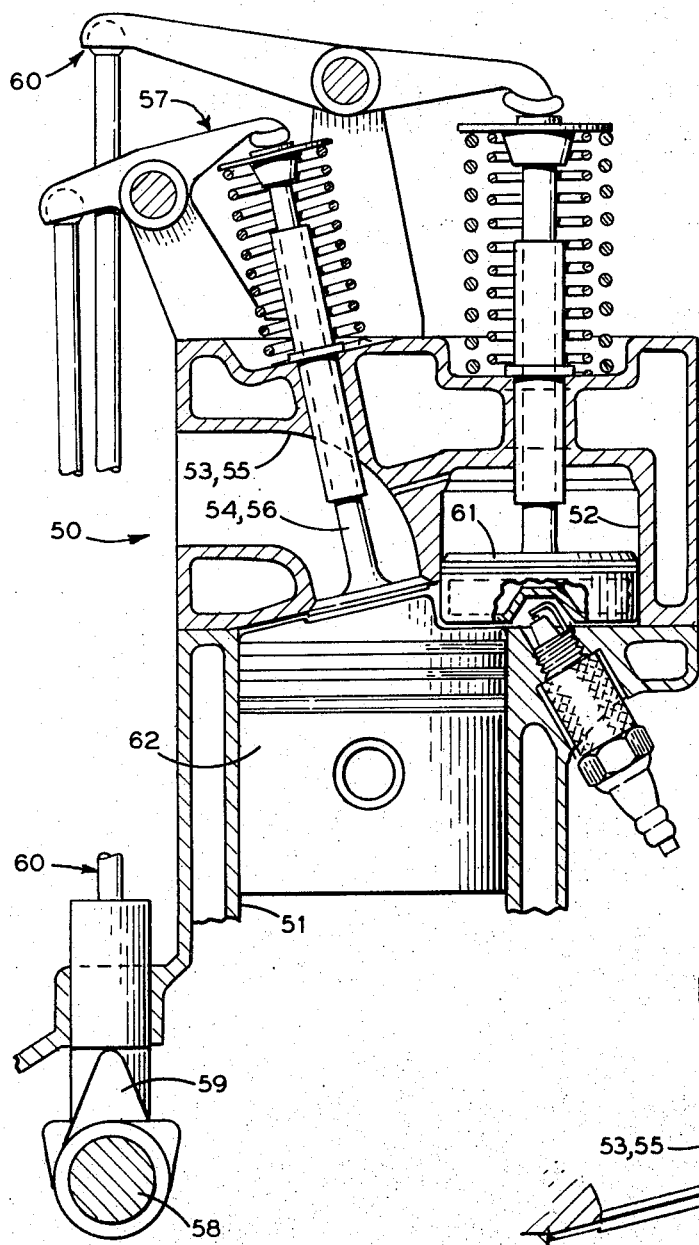
FIG. 4 is a schematic longitudinal cross-sectional view, taken through a typical cylinder, of an internal combustion engine constructed according to another embodiment of the invention, and showing the working and auxiliary piston as seen at the end of the exhaust.
Figure 5:
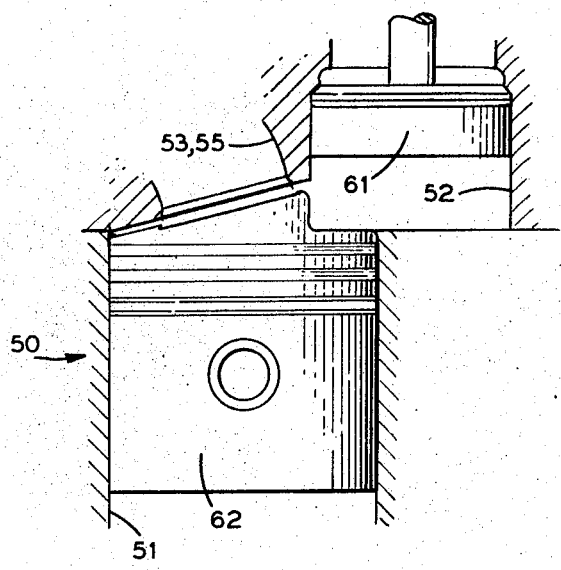
FIG. 5 is a schematic, partial sectional view of the engine shown in FIG. 4, but illustrating the position of the working and auxiliary pistons as seen at the end of compression.

In FIGS. 4 and 5 there is exemplified an engine 50 in which for each typical working cylinder 51 there is provided a communicating auxiliary chamber or cylinder 52. Air-fuel mixture is admitted to cylinder 51 through an inlet 53 and under control of a conventional intake valve 54, and exhaust gases are discharged from cylinder 51 through an outlet 55 under control of a conventional exhaust valve 56. Inlet 53 and outlet 55 are located one behind the other in the direction perpendicular to the plane of the drawing, as are valves 54 and 56, and therefore it will be understood by the artisan that only the outline of one valve 54, 56 and passage 53, 55 is visible.

Valves 54 and 56 are operated by conventional linkage means 57 driven by cams on a camshaft 58. On camshaft 58 is also provided a cam 59 shaped in accordance with the engine timing cycle and which drives a linkage means 60. Within auxiliary cylinder 52 is disposed for travel an auxiliary piston 61. Piston 61 is connected, or otherwise coupled to the linkage 60 for movement thereby in accordance with the engine cycle so that the piston 61 is retracted, as shown in FIG. 5, at the end of the compression part of the cycle to receive in the auxiliary cylinder 52 air-fuel mixture to be ignited and expanded in the power stroke. During the exhaust part of the cycle, piston 61 is moved to the position shown in FIG. 4 to expel the exhaust gases formed.

It can therefore be noted that because the auxiliary cylinder 52 and piston 61 combination allows for the holding of compressed air-fuel mixture outside cylinder 51, the stroke of the working piston 62 can be set, regardless of compression ration, to practically sweep the entire volume of cylinder 51.

As will be appreciated by the artisan, the basic invention is adapted to numerous modifications and variations that will become obvious for a particular application from the description herein of a limited number of selected embodiments.

What is claimed is:

1. In an internal combustion engine having a plurality of axially extending cylinders in a cylinder block disposed for rotation about a cylindrical cam and follower means engaged by said cam and connected to respective pistons in said cylinders, the improvement which comprises said cam having a track surface engaged by said follower means, said track surface having a shape related to the timing of the operating cycle of the engine and which varies the stroke of said pistons in accordance with said operating cycle to reduce the effective combustion chamber volume in said cylinders during the exhaust portion of the cycle to a volume less than that at the end of the compression part of the cycle to aid in the expulsion of exhaust gases from said cylinders; said cylinders and pistons being located at a given radial distance from the axis of cylinder block rotation and said cam extending radially beyond said distance, said pistons having skirts accommodating the movement of the pistons in overlapping relation to said cam, said piston skirts being disposed for wiping contact engagement with the cam to stabilize the pistons against rotary movement relative to the cylinders from positions of alignment with respect thereto.

2. The improvement according to claim 1 including a cylinder head disposed at one end of said block and containing an inlet for introducing air-fuel mixture into the working cylinders and an outlet for the exit of exhaust gases from said cylinders.

3. The improvement according to claim 2 wherein said block includes means defining a port for each cylinder, and said cylinder head includes means defining an inlet port and an outlet port positioned to register in sequence with the port for each cylinder to introduce air-fuel mixture into the cylinder when the cylinder port is registered with the inlet port, and to accommodate exit of exhaust gases when the cylinder port is registered with the outlet port.

* * * * *